(12) United States Patent
Harr

(10) Patent No.: US 12,347,023 B2
(45) Date of Patent: Jul. 1, 2025

(54) SYSTEM AND METHOD FOR VIRTUALIZED ENVIRONMENT

(71) Applicant: Cary Harr, Waretown, NJ (US)

(72) Inventor: Cary Harr, Waretown, NJ (US)

( * ) Notice: Subject to any disclaimer, the term of this patent is extended or adjusted under 35 U.S.C. 154(b) by 156 days.

(21) Appl. No.: 18/077,071

(22) Filed: Dec. 7, 2022

(65) Prior Publication Data

US 2023/0186552 A1 Jun. 15, 2023

Related U.S. Application Data

(60) Provisional application No. 63/287,764, filed on Dec. 9, 2021.

(51) Int. Cl.
| | |
|---|---|
| *G06T 15/00* | (2011.01) |
| *G06F 3/14* | (2006.01) |
| *G06T 7/60* | (2017.01) |
| *G06T 7/70* | (2017.01) |
| *G06T 15/20* | (2011.01) |
| *H04R 5/02* | (2006.01) |
| *H04R 5/04* | (2006.01) |
| *H04S 7/00* | (2006.01) |

(52) U.S. Cl.
CPC ............ *G06T 15/20* (2013.01); *G06F 3/1423* (2013.01); *G06T 7/60* (2013.01); *G06T 7/70* (2017.01); *H04R 5/02* (2013.01); *H04R 5/04* (2013.01); *H04S 7/30* (2013.01); *H04S 2400/11* (2013.01)

(58) Field of Classification Search
CPC .......... H04R 5/02; H04R 5/04; G06F 3/1423; G06T 7/70; G06T 7/60; G06T 15/20; H04S 7/301; H04S 7/30; H04S 2400/11
USPC ....................................................... 345/418
See application file for complete search history.

(56) References Cited

U.S. PATENT DOCUMENTS

| | | | |
|---|---|---|---|
| 6,106,298 A | 8/2000 | Pollak | |
| 6,275,258 B1 * | 8/2001 | Chim | H04N 23/661 |
| | | | 348/169 |
| 7,453,418 B2 | 11/2008 | Palmquist | |
| 8,253,649 B2 | 8/2012 | Imai | |
| 10,921,373 B2 | 2/2021 | Lassalle-Balier et al. | |
| 11,868,672 B1 * | 1/2024 | Dehkordi | G06F 3/1446 |
| 2013/0321461 A1 * | 12/2013 | Filip | G06F 3/147 |
| | | | 345/632 |
| 2019/0073831 A1 * | 3/2019 | Kim | G06F 3/011 |
| 2020/0363636 A1 * | 11/2020 | Karafin | G06F 3/016 |
| 2022/0391617 A1 * | 12/2022 | Chastain | G06V 10/95 |

(Continued)

OTHER PUBLICATIONS

Caeyers F. The design of movie-based theme park attractions: Exploring environmental storytelling to create immersive dark ride experiences (Doctoral dissertation, Université du Québec à Chicoutimi), Nov. 23, 2021.*

(Continued)

*Primary Examiner* — Phu K Nguyen

(74) *Attorney, Agent, or Firm* — Bold IP, PLLC; Christopher Mayle

(57) ABSTRACT

A system and method for a virtual environment with multiple display devices connected to one or more computing systems with hardware and software that replicates the camera and speaker (3D sounds) setup needed to create the portals in the real-world environment corresponding to virtual environments that are viewable through the portals with designated point of views corresponding to the real-world locations of the display devices.

14 Claims, 8 Drawing Sheets

(56) References Cited

U.S. PATENT DOCUMENTS

| | | | | |
|---|---|---|---|---|
| 2023/0267853 | A1* | 8/2023 | Dyson | G09B 23/24 |
| | | | | 434/282 |
| 2023/0343035 | A1* | 10/2023 | Li | G06T 19/003 |
| 2024/0075394 | A1* | 3/2024 | Carbonar | A63G 31/00 |
| 2024/0104877 | A1* | 3/2024 | Henderson | G06F 3/0482 |
| 2024/0144604 | A1* | 5/2024 | Zavesky | G06T 19/003 |

OTHER PUBLICATIONS

Roussou, M., 2001. Immersive interactive virtual reality in the museum. Proc. of TiLE (Trends in Leisure Entertainment).*

Carrozzino M, Bergamasco M. Beyond virtual museums: Experiencing immersive virtual reality in real museums. Journal of cultural heritage. Oct. 1, 2010;11(4):452-8.*

Nelson T. Impact of virtual and augmented reality on theme parks. Master Degree Paper, Ryerson University. 2016:3.*

Khalidov V, Forbes F, Hansard M, Arnaud E, Horaud R. Audio-Visual clustering for 3D speaker localization. InInternational Workshop on Machine Learning for Multimodal Interaction Sep. 8, 2008 (pp. 86-97). Berlin, Heidelberg: Springer Berlin Heidelberg.*

Christensen H, Barker J. Using location cues to track speaker changes from mobile, binaural microphones. InINTERSPEECH Sep. 2009 (pp. 140-143).*

Atmoph Window 2 Connect to the world, atmoph.com. https://atmoph.com/en/products/aw102 [Date accessed Aug. 10, 2021].

* cited by examiner

FIG. 8
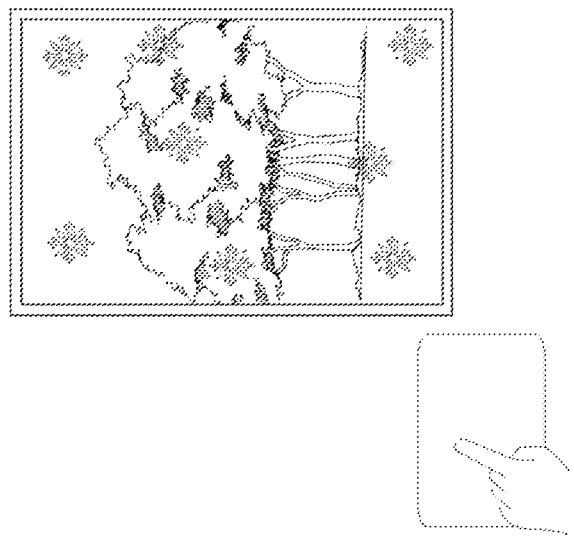
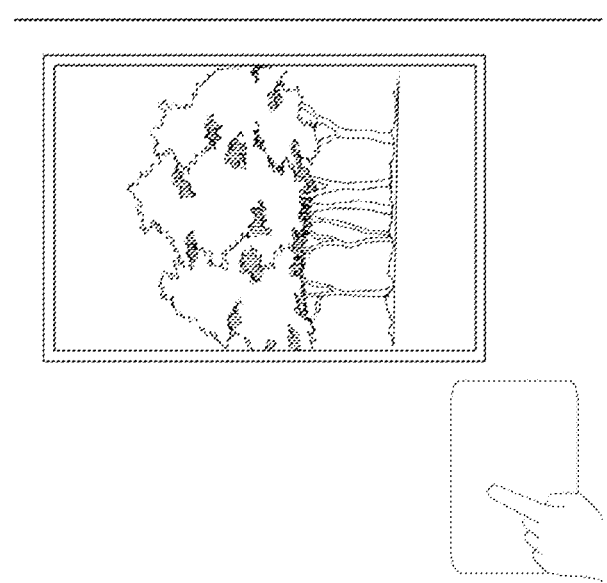

SYSTEM AND METHOD FOR VIRTUALIZED ENVIRONMENT

CROSS REFERENCE TO RELATED APPLICATIONS

This application claims priority to U.S. Provisional Patent No. 63/287,764 filed on Dec. 9, 2021 which is incorporated in its entirety.

FIELD OF INVENTION

The present invention is a device, method, and application which provides a virtualized environment for viewers. Aspects of the invention include one or more devices connected to displays and speakers to create a virtualized environment using either a single computer or a server-based methodology combined with a programmatic method for ensuring that action takes place on customized portals.

BACKGROUND

Different forms of theaters and virtual reality presentation methods exist to display a view of an environment. Virtual reality video games allow a user to view an interactive virtual world and often the users can move through the virtual world. However, these virtual experiences require headsets that isolate the user from others. 3D movie theaters have less isolating headgear (normally a pair of goggles that can be seen through). However, the movie is only viewable on a single screen in front of a viewer, is not immersive, and cannot be customized based on a unique layout of space.

Some theme park rides have visual environments that wrap around the riders, providing a more immersive experience. However, these rides are usually not a virtual reality but rather a synchronized set of videos being played on several screens. Furthermore, none of these experiences allow for customization of equipment for different screen numbers, different screen locations, different screen sizes, etc.

SUMMARY

Aspects of the invention include a device, method, and application for creating and customizing a virtualized experience based on equipment and space available to the user.

BRIEF DESCRIPTION OF DRAWINGS

FIG. 8 shows an example of another method of use.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100.

Figure 1:
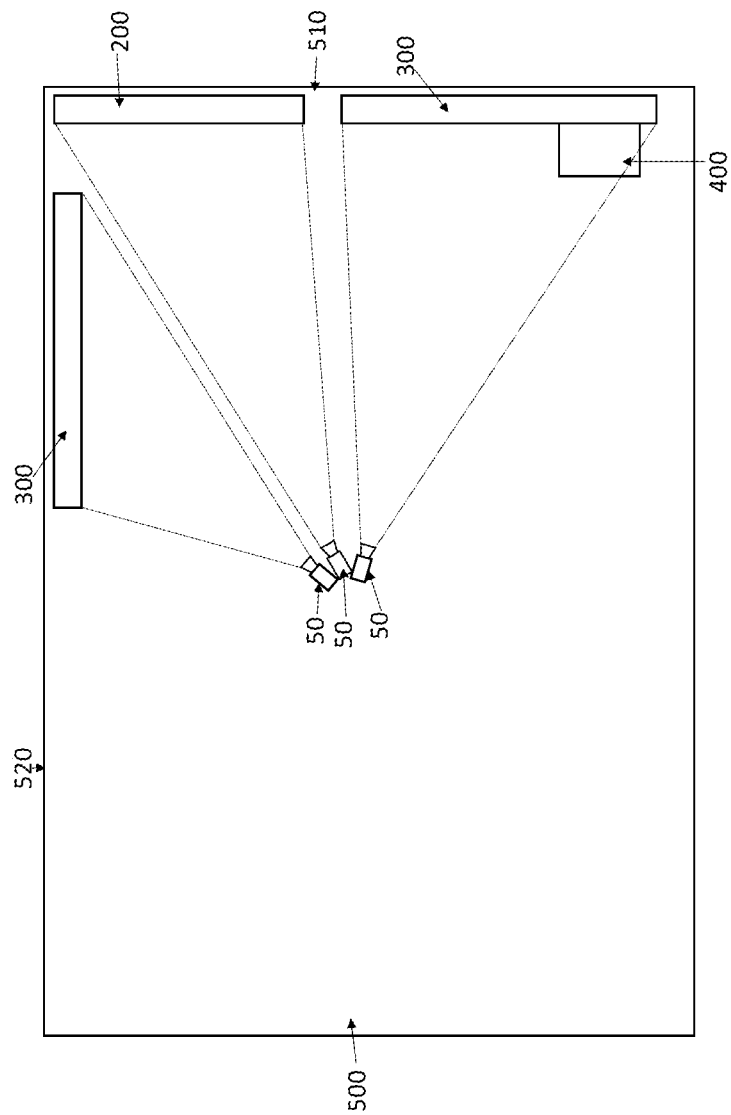
FIG. 1 shows an example top view of a first room.

FIG. 1 shows an example top view of a first room 500. The first room 500 may have a first wall 510 and a second wall 520. The first wall may have a second device 200, a third device 300 and a fourth device 400 on or proximate to the first wall 510. The second wall 520 may have a third 300 device on or proximate to the second wall 520. The first wall 510 and the second wall 520 may join at a corner.

As discussed in greater detail below, a second device 200 may include a speaker and a display, a third device 300 may include a display but no speaker, and a fourth device 400 may include a speaker and no display. Each display of the second device 200 and the third devices 300 may include a virtual point of view 50. The virtual point of view may be a virtual camera angle from which the display is meant to be viewed in order to have proper perspective to the viewer. The virtual points of view 50 for all displays in a room may be from a single point (with different angles) so that a person standing at or near the point can see each of the displays as if they were portals into a virtual world which all agree on perspective.

The displays on second device 200 and third device 300 may include an input device as part of the display. The input device may be a touchscreen or other interactive display that can receive commands from a controller or voice activation whereby when a user interacts with one of the displays corresponding changes may occur in other displays. This would be useful for an escape room where one interaction on one display may open up other activities on other displays in the room.

A touch interface screen that modifies the environment is illustrated in FIG. 8. For example, a nature scene that looks out through a forest can be modified using the touch screen to change the time of day, add snow to a scene or to create a sunrise. The touch interface directly interacts with the scene modifying the environment in some way.

Figure 6:
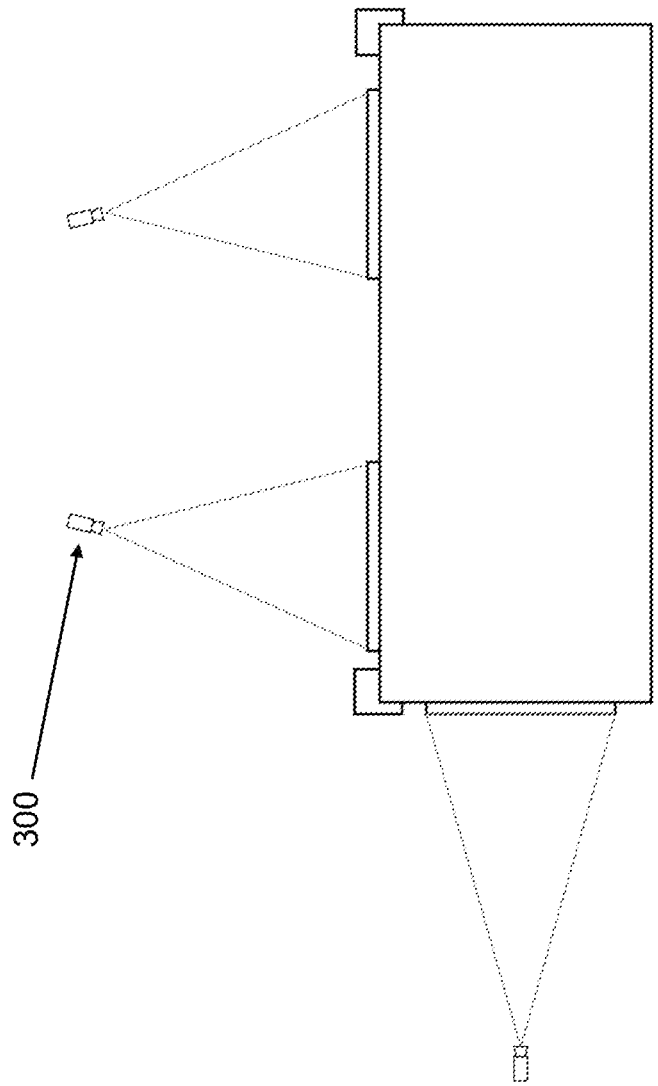
FIG. 6 shows an example of an outside area.

The speakers of the fourth device 400 and the second device 200 may be used to create an immersive sound experience such that viewed objects through the displays have sounds with the appropriate directionality for the viewed objects. For example, if in the virtual world a creature is walking past the displays of the second device 200 and the third device 300 on or proximate to the first wall 510, the sounds output by the fourth device 400 and the second device 200 will agree with the apparent location of the creature seen on the displays. Additionally, sounds can be generated for activities happening offscreen that may eventually appear onscreen or that may set up a future activity on screen. Speaker locations are synchronized with virtual world "microphones" to ensure that 3D sounds are true representations of sounds happening in the virtual environment. It should be appreciated the displays may point inward to a room 500 as well as outward to an open area as illustrated in FIG. 6.

Figure 2:
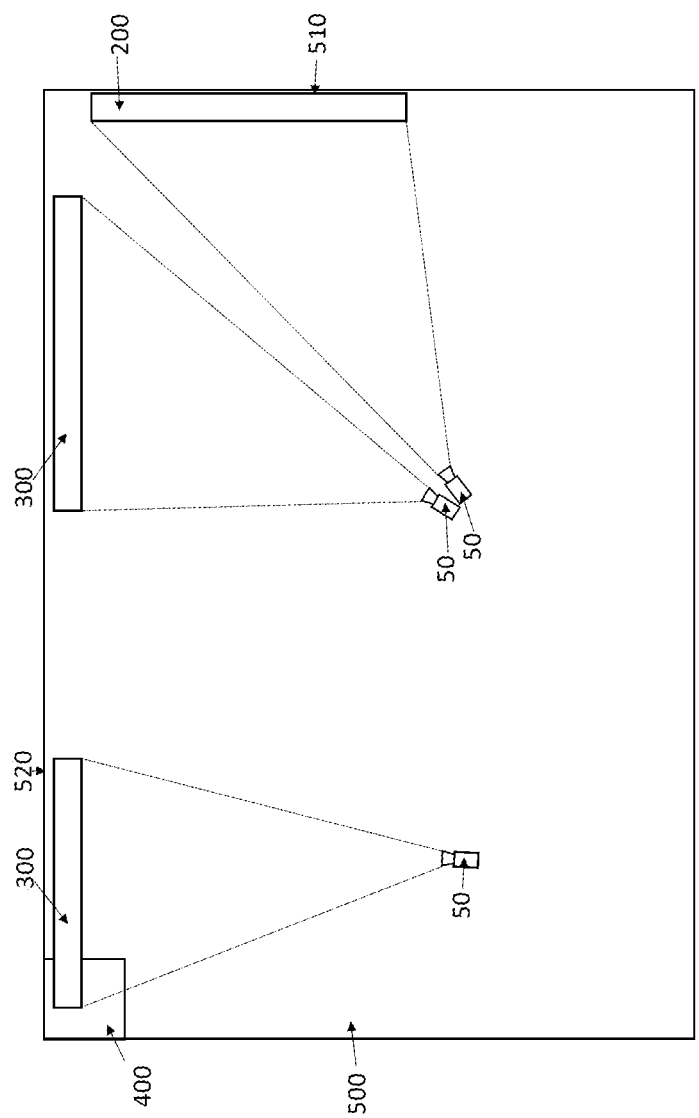
FIG. 2 shows an example top view of a second room.

FIG. 2 shows an example top view of a second room 500. The second room may be substantially the same as the first room 500 except for the arrangement of the devices within the room. For example, the fourth device 400 and two third devices 300 may be on or proximate to the second wall 520 and a second device 200 may be on the first wall 510. The virtual point of view 50 for one of the third devices 300 on the second wall 520 and the second device on the first wall 510 may be from the same point (i.e., agree on perspective). The virtual point of view 50 of the other third device on the second wall 520 may have a different perspective. It may be advantageous in many circumstances to have different perspectives for different displays if, for example, the displays are likely to be viewed from a different angle. As an example, in a Halloween scare house, displays may be set up to be viewed as patrons walk through the scare house with the displays showing a virtual world of terrifying creatures. The virtual points of view 50 being selected based on the location where the people are likely to look at the display.

Figure 3:
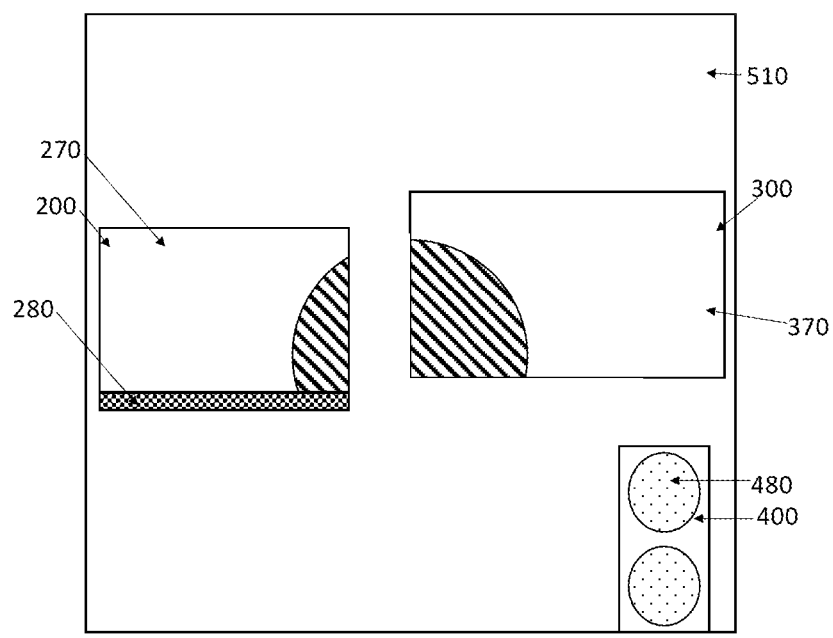
FIG. 3 shows an example front view of a first wall of the first room.

FIG. 3 shows an example front view of the first wall 510 of the first room 500. The second device 200 may have a display 270 and a speaker 280. The third device 300 may have a display 370. The fourth device 400 may have a speaker 480. The displays of the second device 200 and the third device 300 may be at different levels but agree on perspective. A single object from the virtual world may be seen partially on multiple displays or may be seen passing from display to display. Sounds emitted by the speakers 280, 480 may add to the experience of the viewer seeing an object appear to move through the virtual world from display to display by changing the perceived location of the sound associated with the virtual object as the virtual object moves through the virtual world (whether the virtual object is currently being displayed on a display or not).

Figure 4:
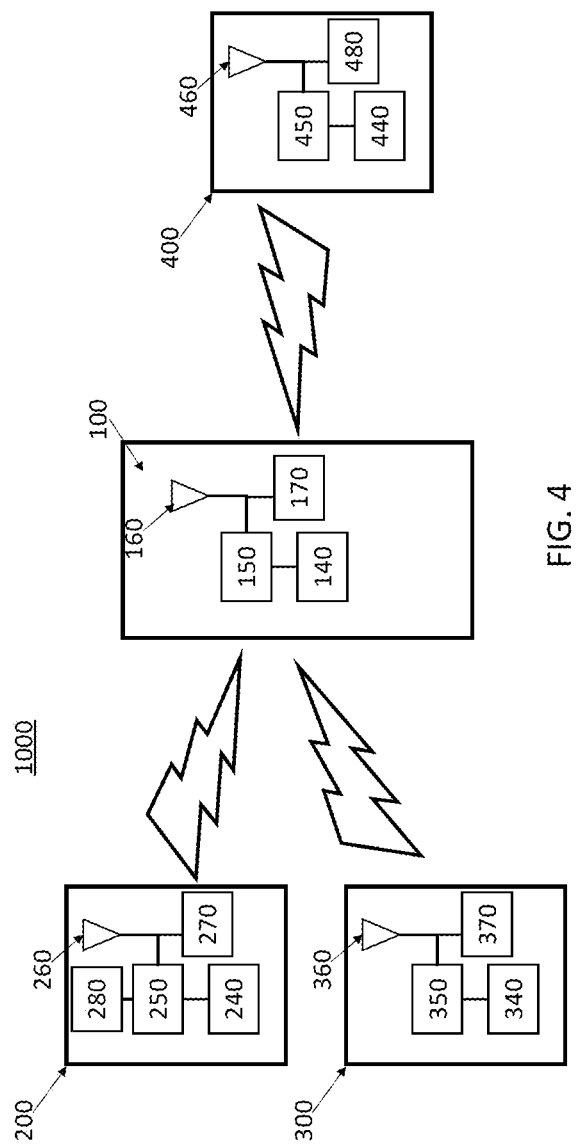
FIG. 4 shows a schematic view of a system.

FIG. 4 shows a schematic view of a system 1000. The system 1000 may include a first device 100 and some combination of at least one second device 200, at least one third device 300, and/or at least one fourth device 400.

The first devices 100 may be user devices through which users interact with the system 1000. For example, the first devices 100 may include laptop computers, desktop computers, mobile phones, tablets, and other consumer electronic devices. The first electronic device may include a memory 140, a processor 150, and a transceiver 160. The memory 140 may include volatile and non-volatile memory. The memory 140 may contain therein instruction for operating the first electronic device and other stored information. The memory 140 may be a non-transitory readable medium holding instructions thereon for implementing the features described below as part of an application, program, or other implementation of electronic instructions using electronic devices. The processor 150 may include one or more processing devices such as a central processing unit, controller, or other similar hardware. The processor 150 may be configured to execute the instructions stored in the memory 140 and control the first electronic device 100. The transceiver 160 may include one or more communication interfaces for wireless communications, wired communications, fiber optic communications, etc. The transceiver 160 may operate based on commands received from the processor 150 and be configured to communicate electronically with other electronic devices in the system 1000. The first electronic device 100 may also include a display 170. The display 170 may be configured to display images and information for a user based on commands received from the processor 150. The display 170 may be a touch screen capable of receiving input from a user.

The second electronic device 200 may be a display and audio device. The second device may be a computer with a display and speakers, a tv, or other device with display and audio capabilities. The second electronic device may include a memory 240, a processor 250, a transceiver 260, a display 270 and a speaker 280. The memory 240 may include volatile and non-volatile memory. The memory 240 may contain therein instructions for operating the second electronic device, operating a software platform, and other stored information. The memory 240 may be a non-transitory readable medium holding instructions thereon for implementing the features described below as part of an application, program, or other implementation of electronic instructions using electronic devices. The processor 250 may include one or more processing devices such as a central processing unit, controller, or other similar hardware. The processor 250 may be configured to execute the instructions stored in the memory 240 and control the second electronic device 200. The transceiver 260 may include one or more communication interfaces for wireless communications, wired communications, fiber optic communications, etc. The transceiver 260 may operate based on commands received from the processor 250 and be configured to communicate electronically with other electronic devices in the system 1000. The display 270 may be configured to display images and information based on commands received from the processor 250. The speaker 280 may be configured to output sounds based on commands received from the processor 250.

The third device 300 may be a display device. The third device 300 may be any device with a display including a monitor, a smart electronic photo, a projector, or other form of electronic device that has a display. The third electronic device 300 may include a memory 340, a processor 350, a transceiver 360, and a display 370. The memory 340 may include volatile and non-volatile memory. The memory 340 may contain therein instruction for operating the third electronic device 300 and other stored information. The memory 340 may be a non-transitory readable medium holding instructions thereon for implementing the features described below as part of an application, program, or other implementation of electronic instructions using electronic devices. The processor 350 may include one or more processing devices such as a central processing unit, controller, or other similar hardware. The processor 350 may be configured to execute the instructions stored in the memory 340 and control the third electronic device 300. The transceiver 360 may include one or more communication interfaces for wireless communications, wired communications, fiber optic communications, etc. The transceiver 360 may operate based on commands received from the processor 350 and be configured to communicate electronically with other electronic devices in the system 1000. The display 370 may be configured to display images and information based on commands received from the processor 350.

The fourth device 400 may be an audio device (e.g., a device used to create sounds). The fourth device 400 may include speakers and other electronic devices that can generate sound. The fourth electronic device 400 may include a memory 440, a processor 450, a transceiver 460, and a speaker 480. The memory 440 may include volatile and non-volatile memory. The memory 440 may contain therein instruction for operating the fourth electronic device 400 and other stored information. The memory 440 may be a non-transitory readable medium holding instructions thereon for implementing the features described below as part of an application, program, or other implementation of electronic instructions using electronic devices. The processor 450 may include one or more processing devices such as a central processing unit, controller, or other similar hardware. The processor 450 may be configured to execute the instructions stored in the memory 440 and control the fourth electronic device 400. The transceiver 460 may include one or more communication interfaces for wireless communications, wired communications, fiber optic communications, etc. The transceiver 460 may operate based on commands received from the processor 450 and be configured to communicate electronically with other electronic devices in the system 1000. The speaker 480 may be an electronic speaker capable of generating sound based on commands from the processor 450.

The first device 100 may communicate with the second device 200, the third device 300, and/or the fourth device 400 via wired or wireless electronic communication. The first device 100 may communicate with any of the second device 200, the third device 300, and/or the fourth device 400 through other electronic devices including others of the second device 200, the third device 300, and the fourth device 400. For example, if the fourth device 400 is a Bluetooth speaker paired with the third electronic device 300. The first electronic device 100 may send commands to the fourth device 400 via the third device 300.

A display and/or speakers of the first electronic device may be used for output. Thus, the first device 100 may also act as a second device 200, third device 300, or fourth device 400 in the system 1000.

Figure 5:
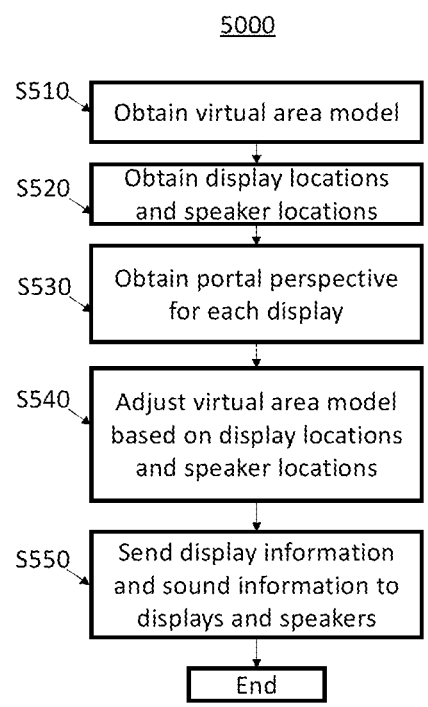
FIG. 5 shows a flow diagram of actions performed by a first device.

FIG. 5 shows a flow diagram of actions performed by the first device 100. At S510, the first device 100 may obtain a virtual area model. The virtual area model may be a virtual world with one or more assets or objects or other visible or audio expressions that move through the virtual world. The virtual area model may have interactive elements that interact based on the location of displays in the real world. For example, in a safari virtual area model, different animals may appear to approach the displays and appear to look into the room 500 through the displays. The virtual area model may include audio and visual information that is universal to the virtual area model (e.g., the location of an object or sound source in the virtual world is definite) but are interpreted by the first device 100 to determine outputs for the displays and speakers of the second devices 200, the third devices 300, and the fourth devices 400.

At S520, the first device 100 may obtain display locations and speaker locations for the second devices 200, the third devices 300, and the fourth devices 400. The room 500 may also be mapped as a virtual space in the virtual world. The room 500 may be mapped as a virtual space in the virtual world to prevent objects seeming to pass through the room 500 and to improve the interactions between the objects and the displays. For example, on a safari virtual area model it may be jarring (e.g., ruin immersion for viewers) to have animals appear to walk through the room 500 the viewer is standing in. Conversely, immersion can be improved by having virtual animals turn to walk around the room's virtual representation so the animals appear to be interacting with the room 500. The virtual representation of the room can match the room 500 in shape.

The room 500 dimensions, the display locations within the room 500, and the speaker locations within the room 500 may be mapped manually by a user entering the dimensions of the room 500 and entering the three-dimensional coordinates of the display and speakers. The display location for each display may be entered as coordinates of four corners of the display. The speaker locations may be entered as a single three-dimensional coordinate. Alternatively, automated methods may be used to determine the locations of the displays and speakers. For example, a 3-dimensional camera may be used in conjunction with test images being displayed on the displays. By processing the size and angle of each test image as viewed by the 3-dimensional camera, the first device can determine the location and angle of each display. As another example, a 3-dimensional camera may be used to view as a user uses a pointer to point to the corners of displays to map the locations of the corners to determine the locations of the displays. If the display is a projector, the location of the projected image on a wall of the room 500 may be determined at the display location rather than the location of the projector.

Outputting test sounds from the speakers and listening with stereoscopic microphones connected to the first device 100 can allow the first device 100 to determine the location of speakers.

At S530, the first device 100 may obtain a portal perspective for each display. The portal perspective is the point of view in the virtual world for the perspective view of the display. The portal perspective acts as a virtual camera in the virtual world that is used to determine what is displayed on the display. The portal perspective matches the virtual point of view 50 such that a person viewing the display from the virtual point of view 50 has a proper perspective of the virtual world through the display. The portal perspective for each display may be manually entered as a three-dimensional coordinate in the virtual room. The portal perspective may have an automatic location (e.g., 5 feet directly in front of the display) that can be adjusted.

At S540, the first device 100 may adjust the virtual area model based on display locations and speaker locations. For example, for a safari virtual area model, the path that virtual animals take may be programmatically changed to have the animals pass within view of each of the custom displays. If there is a display on the ceiling of room 500, then the path of virtual birds may be programmatically adjusted to be viewed through the display on the ceiling, while otherwise the virtual birds would fly in a different path so they would be seen in a different display. The associated sounds of the virtual animals may be likewise changed to match the movements of the virtual animals in the virtual world.

As another example, for a virtual solar system display, the orientation of the virtual room in the virtual room may be adjusted so that planets can be viewed from the displays for a greater amount of time as they orbit around the sun. Also, the orientation of the virtual room 500 in the virtual world may be adjusted so the sun is centered in the view of one of the displays. All of these adjustments may be done automatically based on the programming of the virtual area model or instructions stored on the first device 100.

At S550, the first device may send display information and sound information to the displays and speakers. The display information may include the determined video output to be displayed by the display based on the display location and portal perspective of the virtual area model. The sound information may include sound to be output by the speaker based on the location of the speaker and other speakers and the location of sounds in the virtual area model. The display information and sound information may also include synchronization information for timing when the video and sounds are to be output by the second devices 200, third devices 300, and fourth devices 400. The display information and the sound information may be sent as a continuous stream of information or as a complete set of outputs or some combination thereof.

Figure 7:
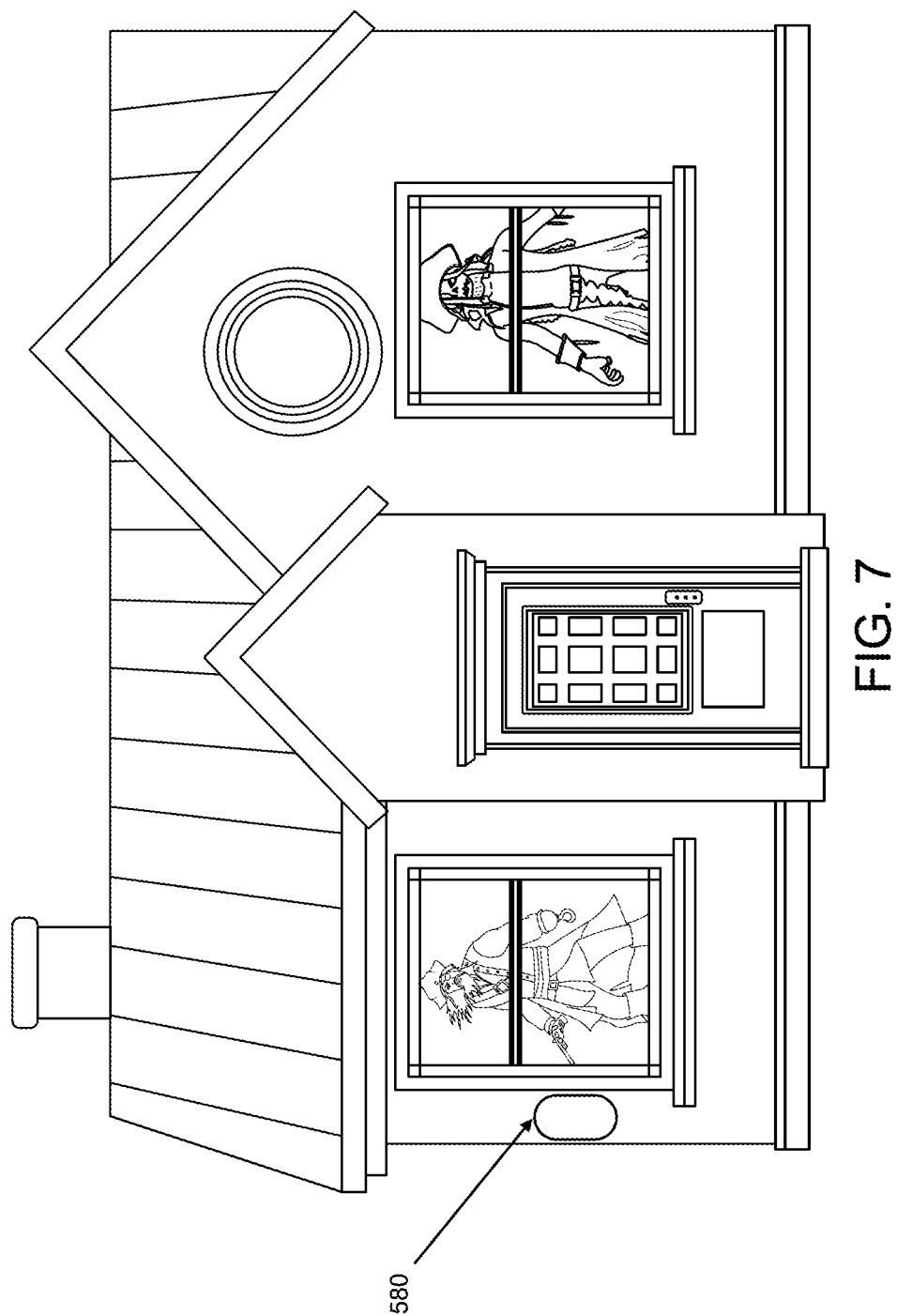
FIG. 7 shows an example of a method of use.

In some embodiments, triggers 580, as illustrated in FIG. 7, such as a motion sensor may be used as a trigger to begin outputting video display and sound (e.g., in a Halloween scare house a motion sensor may be used to start display of frightening monsters going by the displays). Other triggers and interactions may also be used that adjusts the output of the system 1000.

One great advantage of this system 1000 over other systems is the customizability of the system 1000. A new display can be easily added, a display or speaker location can be changed. Displays and speakers can be exchanged. Different rooms of various sizes can be used.

Accordingly, the present description provides for various embodiments for a system 1000 for displaying a virtualized environment. Many uses and advantages are offered by the system 1000 for displaying a virtualized environment as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A virtual environment system comprising:
   at least one memory including processor readable instructions; and
   at least one processor arranged to read and execute the processor readable instructions stored on the at least one memory and execute the processor readable instructions to:
   obtain a virtual area model;
   obtain display locations of a plurality of displays and speaker locations for a plurality of speakers;
   obtain a portal perspective for each display of the plurality of displays, wherein the portal perspective is automatic and adjustable;
   adjust the virtual area model based on the display locations of each display of the plurality of displays, and the speaker locations of each speaker of the plurality of speakers, wherein the adjusting of the virtual area model comprises programmatically changing paths of virtual objects to ensure visibility on the plurality of displays; and
   send display information to each display of the plurality of displays and send sound information to each speaker of the plurality of speakers based on the adjusted virtual area model.

2. The virtual environment system of claim 1, wherein the at least one processor is further arranged to read and execute the processor readable instructions stored on the at least one memory and execute the processor readable instructions to:
   create a virtual map of an area in which each display of the plurality of displays is located; and
   adjust the virtual area model based on the virtual map of the area including entering the virtual map of the area into the virtual area model.

3. The virtual environment system of claim 2, wherein the at least one processor is further arranged to read and execute the processor readable instructions stored on the at least one memory and execute the processor readable instructions to:
   adjust the virtual area model to prevent the virtual objects from appearing to pass through a mapped virtual space of a physical room.

4. A virtual environment system comprising:
   one or more displays;
   at least one memory including processor readable instructions; and
   at least one processor arranged to read and execute the processor readable instructions stored on the at least one memory and execute the processor readable instructions to:
   create a virtual environment in a physical space;
   determine display locations and angles of the one or more displays using test images to be displayed on the one or more displays wherein by processing a size and angle of the test images as viewed by a virtual camera, the display locations and angles are determined;
   obtain a point of view for each display of the one or more displays;
   determine a portal perspective of a user;
   modify the point of view based on the display locations of each display of the one or more displays for proper alignment with the virtual environment;
   send display information to each display of the one or more displays to a corresponding area of the virtual environment; and
   adjust the virtual points of view for the virtual displays based on the portal perspective to maintain proper perspective.

5. The virtual environment system of claim 4, further comprising one or more triggers to activate one or more assets in the virtual environment to appear on the one or more displays.

6. The virtual environment system of claim 5, wherein the one or more triggers is a motion sensor.

7. The virtual environment system of claim 4, wherein the one or more displays have an interface element for interacting with the virtual environment wherein a first action on a first display of the one or more displays causes a first effect on a second display of the one or more displays.

8. The virtual environment system of claim 4, wherein the at least one processor is further arranged to read and execute the processor readable instructions stored on the at least one memory and execute the processor readable instructions to:
define paths for virtual objects that avoid intersecting with mapped virtual space corresponding to the physical space.

9. The virtual environment system of claim 4, wherein the at least one processor is further arranged to read and execute the processor readable instructions stored on the at least one memory and execute the processor readable instructions to:
determine a size of an area the one or more displays have been placed.

10. The virtual environment system of claim 9, wherein the at least one processor is further arranged to read and execute the processor readable instructions stored on the at least one memory and execute the processor readable instructions to:
match the size of the area to a size of the virtual environment.

11. The virtual environment system of claim 4, further comprising one or more speakers.

12. The virtual environment system of claim 11, wherein the at least one processor is further arranged to read and execute the processor readable instructions stored on the at least one memory and execute the processor readable instructions to:
synchronize speaker sounds from the one or more speakers to sounds happening in the virtual environment.

13. The virtual environment system of claim 4, wherein the one or more displays are positioned at different elevations.

14. The virtual environment system of claim 4, wherein one or more assets are viewable at different perspectives through the one or more displays.

* * * * *